(12) United States Patent
Mesiä et al.

(10) Patent No.: US 9,863,845 B2
(45) Date of Patent: Jan. 9, 2018

(54) TECHNIQUES FOR MONITORING GEAR CONDITION

(71) Applicant: KONECRANES GLOBAL CORPORATION, Hyvinkää (FI)

(72) Inventors: Heikki Mesiä, Vantaa (FI); Juhani Kerovuori, Jokiniemi (FI); Ilkka Harra, Hyvinkää (FI); Aapo Jantunen, Hyvinkää (FI); Janne Salomäki, Helsinki (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 234 days.

(21) Appl. No.: 14/892,916

(22) PCT Filed: May 21, 2014

(86) PCT No.: PCT/FI2014/050390
§ 371 (c)(1),
(2) Date: Nov. 20, 2015

(87) PCT Pub. No.: WO2014/188072
PCT Pub. Date: Nov. 27, 2014

(65) Prior Publication Data
US 2016/0091394 A1 Mar. 31, 2016

(30) Foreign Application Priority Data

May 21, 2013 (FI) ...................................... 20135546
May 24, 2013 (FI) ...................................... 20135567

(51) Int. Cl.
*G01M 13/02* (2006.01)
*G01H 1/00* (2006.01)
(Continued)

(52) U.S. Cl.
CPC .......... *G01M 13/021* (2013.01); *G01H 1/006* (2013.01); *G01P 3/44* (2013.01); *H02P 29/032* (2016.02)

(58) Field of Classification Search
CPC ................................................... G01M 13/021
(Continued)

(56) References Cited

U.S. PATENT DOCUMENTS 5,115,671 A 5/1992 Hicho
5,501,105 A 3/1996 Hernandez et al.
(Continued)

FOREIGN PATENT DOCUMENTS

DE 40 17 448 A1 12/1990
EP 2 314 995 A2 4/2011
(Continued)

*Primary Examiner* — David S Luo
(74) *Attorney, Agent, or Firm* — Birch, Stewart, Kolasch & Birch, LLP (57) ABSTRACT

Method/apparatus for performing the following acts on a system that includes an electrical motor followed by a gear, and a speed output unit: monitoring a first set of frequencies from the system over a measurement period when the system is in a known good operating condition; storing the first set of monitored frequencies or derivatives thereof as reference data in a long-term storage system; monitoring a second set of frequencies from the system over a measurement period when the system is in an unknown operating condition; comparing the second set of monitored frequencies with the first set of monitored frequencies in a frequency domain; in the frequency domain, detecting changes between corresponding frequencies resulting from the second set of monitored frequencies and the first set of monitored frequencies.

20 Claims, 10 Drawing Sheets (51) Int. Cl.
    *G01P 3/44*     (2006.01)
    *H02P 29/032*     (2016.01)

(58) Field of Classification Search
    USPC ................................................ 318/34, 12, 3
    See application file for complete search history.

(56) References Cited

U.S. PATENT DOCUMENTS

| | | | |
|---|---|---|---|
| 5,610,339 | A | 3/1997 | Haseley et al. |
| 6,445,995 | B1 | 9/2002 | Mollmann |
| 7,859,749 | B2 * | 12/2010 | Fox ...................... A61B 5/0064 359/196.1 |
| 2012/0072136 | A1 | 3/2012 | Hedin |
| 2012/0126738 | A1 | 5/2012 | Li et al. |
| 2012/0203497 | A1 | 8/2012 | Yamane et al. |

FOREIGN PATENT DOCUMENTS

| | | | |
|---|---|---|---|
| EP | 2581724 | A1 | 4/2013 |
| JP | 5069923 | B2 | 11/2012 |

* cited by examiner

TECHNIQUES FOR MONITORING GEAR CONDITION

FIELD OF THE INVENTION

The present invention relates to predicting gear failure in connection with electrical motors, particularly in connection with electrical motors driven by motor drives.

BACKGROUND OF THE INVENTION

To provide a concrete, albeit non-restricting example, problems underlying the invention are described in connection with electrical drives that provide vertical movement or movement with a vertical component, such as electrical cranes, hoists or lifts. This is because the load being lifted or suspended affects the entire system of gears, axles and bearings, even in a steady-state condition when motion is stopped. A safety brake is typically installed on the primary or engine side of the gear. If the gear breaks catastrophically, free fall of the load is possible. Those skilled in the art will realize, however, that early prediction of gear failure is desirable in connection with virtually any electrical drives, regardless of direction of motion.

In the context of the present invention, prediction of gear failure comprises two tasks, namely monitoring gear condition and detecting potentially risky changes in the gear condition.

JP05069923B2 discloses techniques for a hoist crane with a diagnosis apparatus that calculates diagnosing value of abrasion of gear wheel based on variations in electric current flowing into motor and rotation angle value of shaft when gear wheel meshes with a motor. An operation control apparatus controls drive of an electric motor and a rotation angle detection apparatus linked to rotating shaft of the motor. A current sensor measures variation in electric current flowing into the motor and the rotation angle detection apparatus detects variation in rotation angle of the shaft when the gear wheel meshes with motor. An abrasion diagnosis apparatus calculates diagnosing value of abrasion of gear wheel based on variations in electric current value and rotation angle value.

A problem with the prior art is the extensive instrumentation required to measure the currents and to detect the various rotation angles with sufficient precision, resolution and repeatability. While it may be feasible to provide new equipment with such additional sensors and connections, retrofitting existing equipment is difficult, labor-intensive and expensive.

SUMMARY OF THE INVENTION

It is an object of the present invention to alleviate one or more of the problems identified above. Specifically, it is an object of the present invention to provide methods, equipment and computer program products that provide improvements in one or more areas, such as reduction of the necessary instrumentation, ease of retrofitting existing equipment, or the like.

The invention is based on the idea of using information that exists in a system comprising an electrical motor and a motor drive, preferably in a closed-loop configuration. It was a hypothesis by the inventors that:
1. If the process, (eg speed or actual speed vs. set speed) changes,
2. Absent changes in the controlling process, such as under constant set values,
3. This change can indicate wear in the gear and, optionally, the component(s) most likely to exhibit wear.

The inventors have tested this hypothesis successfully and experimented with various concrete embodiments for putting the invention to practical use. Embodiments of the invention aim at monitoring condition, particularly relating to wear, of the system being monitored by methods or equipments according to embodiments of the invention. In particular, embodiments of the invention aim at reducing additional instrumentation, such as additional sensors and cabling, which are used for monitoring wear in many of the prior art techniques.

An aspect of the present invention is a method comprising following acts with respect to a system that comprises an electrical motor and a speed output unit, and the electrical motor is followed by a gear:
  monitoring a first set of frequencies from the system over a measurement period when the system is in a known good operating condition;
  storing the first set of monitored frequencies or derivatives thereof as reference data in a long-term storage system;
  monitoring a second set of frequencies from the system over a measurement period when the system is in an unknown operating condition;
  comparing the second set of monitored frequencies with the first set of monitored frequencies in a frequency domain;
  in the frequency domain, detecting changes between corresponding frequencies resulting from the second set of monitored frequencies and the first set of monitored frequencies.

Another aspect of the invention is a data processing system which comprises: a memory system for storing program code instructions and data; a processing system including at least one processing unit, which executes at least a portion of the program code instructions and processes the data; a connection to a system comprising at least speed output unit and an electrical motor; wherein the memory system stores program code instructions that, when executed by the processing system, instruct the processing system to perform the acts of the inventive method.

The invention offers a number of advantages over known vibration-sensing techniques. Unlike techniques which are based on sensing of mechanical vibrations, the present invention can be used without acceleration sensors or cabling for them. Likewise, the present invention can be used without a separate sensor for producing a trigger pulse for starting or synchronizing the measurement. In addition to eliminating the need for acceleration sensor and cabling thereto, the present invention eliminates some of their associated disadvantages, such as the sensitivity to vibration from external sources.

Embodiments of the invention can be utilized in systems that comprise at least one speed output unit and electric motor. A non-exhaustive list of examples comprises lifting equipment, such as cranes, hoists, lifts (elevators), escalators, pumps or windmills.

A motor drive refers to a device or unit that controls one or more aspects of the power feed to the electric motor. A motor drive typically comprises a frequency converter, a variable frequency drive or a pulse-width modulator. The speed output unit can be a dedicated speed detector, such as a pulse sensor that outputs a number of pulses for each revolution of a rotating shaft. As an illustrative but non-restrictive example, the pulse sensor may output 600 pulses per revolution for sufficient resolution. In other implementations the electrical motor is driven by a motor drive, in which case the speed feedback signal can be delivered to the motor drive. Speed feedback signal is given by the speed sensor 2-10. In some implementations the motor drive and the electric motor are arranged into a closed-loop configuration, in which case an observed difference between a set speed and an actual speed may be utilized for additional information. In a closed-loop configuration, actual speed is measured and used as a speed feedback signal for the motor drive. While the invention is applicable to systems without a built-in speed sensor, the invention provides particular benefits in closed-loop systems or other systems which comprise an existing speed sensor with a sufficiently high resolution. The invention is thus at least partially based on the surprising fact that observation of change in frequency components of the rotational speed over time yields valuable information on the condition of the system. The same measured speed or a derivative thereof may be utilized for the purposes of the inventive condition monitoring, whereby the need for additional sensors and cabling is reduced or eliminated altogether.

The act of detecting changes has several possible implementations, such as detection of one or more frequencies at which the amplitude exceeds a certain threshold; a relative change exceeds a certain threshold; or the rate of the change exceeds a certain threshold. Some implementations include indicating an alert condition if at least one detected change between the corresponding frequencies exceeds a predetermined threshold. Alternatively or additionally the method may comprise indicating an alert condition if at least one detected change between the corresponding frequencies exceeds an average change computed over several other changes. Some implementations comprise scaling the first and second frequencies to a common frequency if the frequencies were obtained at different speeds.

Some implementations comprise maintaining data that indicates a set of predictor frequencies at which the detected changes correlate with wear better than at randomly selected frequencies. Changes at the predictor frequencies may be weighted more strongly than changes at other frequencies. In some implementations said comparing the sets of monitored frequencies comprises a cepstrum conversion of each of the first and second set of monitored frequencies. In some implementations said monitoring the first and second set of frequencies comprises monitoring a set value and an actual value of the electrical motor in a closed-loop configuration.

In some implementations the analysis in the frequency domain comprises conversion to a cepstrum. A cepstrum is the result of taking the Fourier transform (FT) of the logarithm of the estimated spectrum of a signal. A benefit of the cepstrum conversion is that harmonic overtones are reduced to their base frequencies. For instance, if a given source of vibration is known to vibrate at, say, 5.5 Hz, and the vibration is not purely sinusoidal, harmonic overtones of $n*5.5$ Hz, n being an integer >1, are also generated from the same source. Reducing the harmonic overtones to their base frequencies simplifies the task of detecting vibration sources whose condition has changed over time. This is because the task of associating base frequencies with the vibration sources is easier compared with the task of associating a complex mix of base frequencies and harmonic overtones with the vibration sources. Those skilled in the art will understand alternative algorithms exist for arriving at a physically equivalent result, which in this case is reduction of harmonic overtones to their base frequencies and the simplification of the task of mapping a set of frequencies to the sources of those frequencies.

BRIEF DESCRIPTION OF THE DRAWINGS

In the following section, specific embodiments of the invention will be described in greater detail in connection with illustrative but non-restrictive examples. A reference is made to the following drawings.

DETAILED DESCRIPTION OF SOME SPECIFIC EMBODIMENTS

Figure 1:
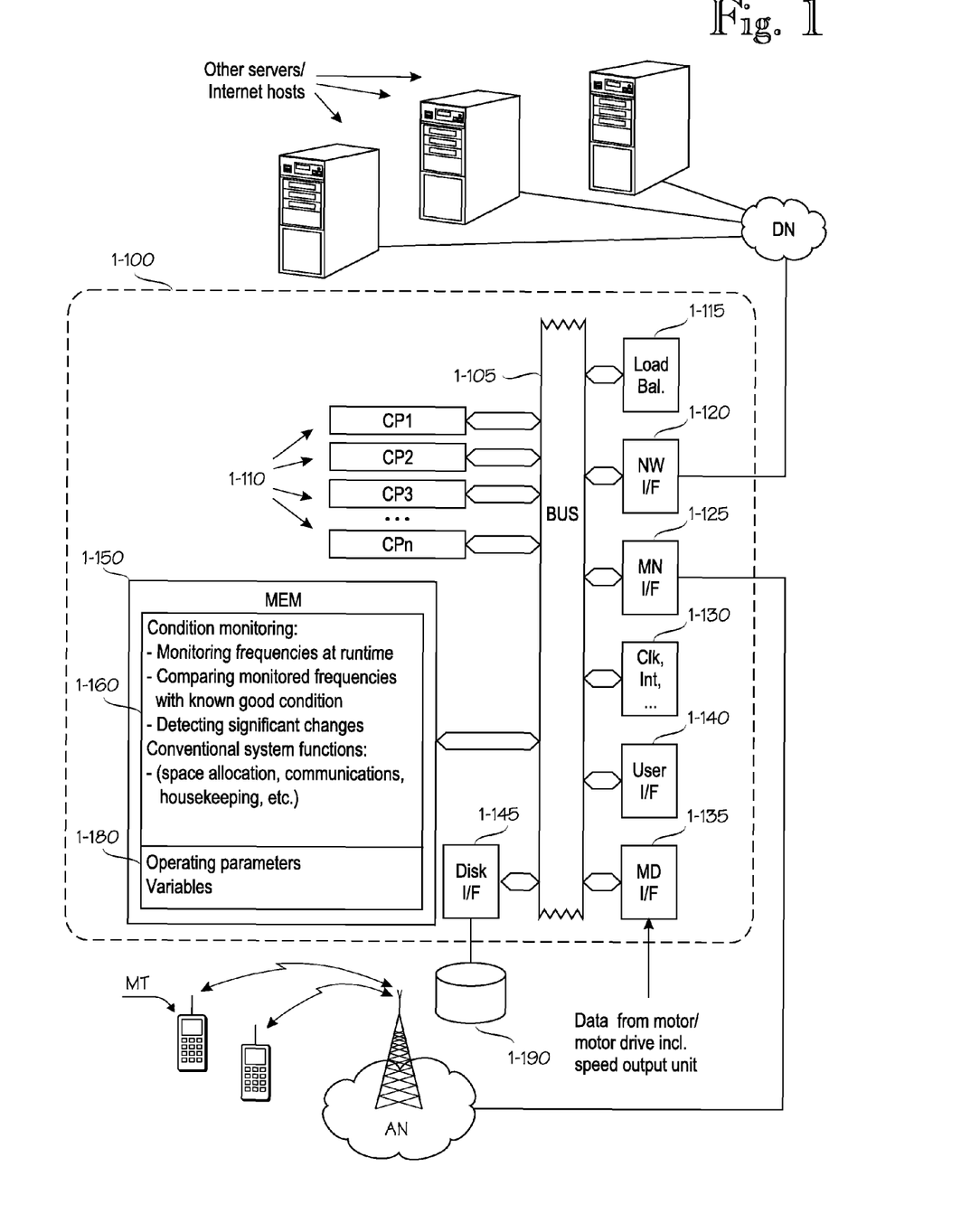
FIG. 1 shows an exemplary data processing architecture that can be programmed to perform the various data processing tasks relating to embodiments of the invention.

FIG. 1 shows an exemplary data processing architecture that can be programmed to perform the various data processing tasks relating to embodiments of the invention. In the following the data processing architecture will be referred to as a computer, but those skilled in the art will realize that the data processing architecture need not be implemented as a dedicated computer. Instead, several embedded techniques are possible, as are techniques in which the inventive functionality is installed on a data processing system that exists for other purposes.

The architecture of the computer, generally denoted by reference numeral 1-100, comprises one or more central processing units CP1 . . . CPn, generally denoted by reference numeral 1-110. Embodiments comprising multiple processing units 1-110 are preferably provided with a load balancing unit 1-115 that balances processing load among the multiple processing units 1-110. The multiple processing units 1-110 may be implemented as separate processor components or as physical processor cores or virtual processors within a single component case. In a typical implementation the computer architecture 1-100 comprises a network interface 1-120 for communicating with various data networks, which are generally denoted by reference sign DN. The data networks DN may include local-area networks, such as an Ethernet network, and/or wide-area networks, such as the internet. In some implementations the computer architecture may comprise a wireless network interface, generally denoted by reference numeral 1-125. By means of the wireless network interface, the computer 1-100 may communicate with various access networks AN, such as cellular networks or Wireless Local-Area Networks (WLAN). Other forms of wireless communications include short-range wireless techniques, such as Bluetooth and various "Bee" interfaces, such as ZigBee or its some of its proprietary implementations.

The computer architecture 1-100 may also comprise a local user interface 1-140. Depending on implementation, the user interface 1-140 may comprise local input-output circuitry for a local user interface, such as a keyboard, mouse and display (not shown). The computer architecture also comprises memory 1-150 for storing program instructions, operating parameters and variables. Reference numeral 1-160 denotes a program suite for the server computer 1-100.

The computer architecture 1-100 also comprises circuitry for various clocks, interrupts and the like, and these are generally depicted by reference numeral 1-130. The computer architecture 1-100 further comprises a storage interface 1-145 to a storage system 1-190. The storage system 1-190 comprises non-volatile storage, such as a magnetically, optically or magneto-optically rewritable disk and/or non-volatile semiconductor memory, commonly referred to as Solid State Drive (SSD) or Flash memory. When the server computer 1-100 is switched off, the storage system 1-190 may store the software that implements the processing functions, and on power-up, the software is read into semiconductor memory 1-150. The storage system 1-190 also retains operating data and variables over power-off periods. The various elements 1-110 through 1-150 intercommunicate via a bus 1-105, which carries address signals, data signals and control signals, as is well known to those skilled in the art.

Reference number 1-135 denotes an interface by which the computer 1-100 obtains data from the system that includes an electric motor and a speed output unit. A specific implementation of such a system, which includes an electric motor and a motor drive in a closed-loop configuration will be shown in FIG. 2. In an open-loop configuration, a speed output unit must be provided separately. It is self-evident that the nature of interface for the speed output unit, depends on the nature of the speed output unit itself. A non-exhaustive list of common examples includes CAN, Profibus, Serial interfaces (eg HMI protocol over physical RS-232 interface), or the like.

Naturally, in cases where the inventive functionality is included in the control system that controls the equipment, such as a crane or hoist, a separate interface 1-135 is superfluous.

The inventive techniques may be implemented in the computer architecture 1-100 as follows. The program suite 1-160 comprises program code instructions for instructing the processor or set of processors 1-110 to execute the functions of the invention or its embodiments, including:
- monitoring a first set of frequencies from the system (such as the closed-loop configuration shown in FIG. 2) over a measurement period when the system is in a known good operating condition;
- storing the first set of monitored frequencies or derivatives thereof as reference data in a long-term storage system;
- monitoring a second set of frequencies from the system over a measurement period when the system is in an unknown operating condition;
- comparing the second set of monitored frequencies with the first set of monitored frequencies in a frequency domain;

in the frequency domain, detecting changes between corresponding frequencies resulting from the second set of monitored frequencies and the first set of monitored frequencies.

In addition to instructions for carrying out a method according to the invention or its embodiments, the memory 1-160 stores instructions for carrying out normal system or operating system functions, such as resource allocation, inter-process communication, or the like.

Figure 2:
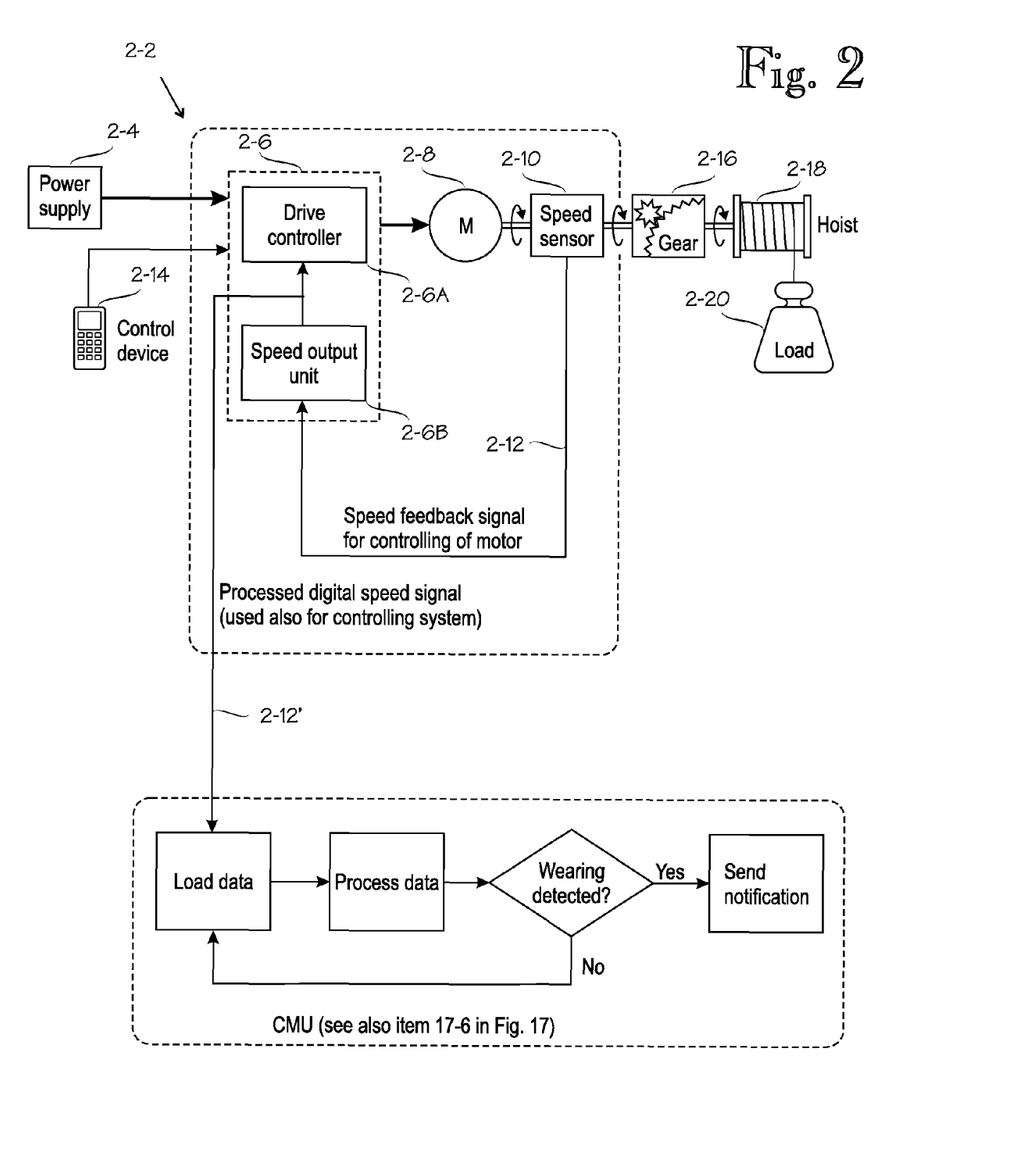
FIG. 2 illustrates a motor drive in a closed-loop speed control configuration, wherein a speed output signal from the closed loop configuration is branched off to a condition monitoring unit.

FIG. 2 illustrates an illustrative but non-restrictive implementation for a system that includes an electric motor and a speed output unit. The implementation shown in FIG. 2 comprises a motor drive in a closed-loop speed control configuration. Block 2-2, which is drawn with a dashed outline, depicts the closed-loop speed control configuration. Reference number 2-4 denotes a power supply configured to supply power via a motor drive 2-6 to a motor 2-8. In this embodiment, the motor drive 2-6 comprises a drive controller 2-6A and a speed output unit 2-6B. Motor speed is monitored by a speed sensor 2-10 that provides a speed feedback signal 2-12 to the motor drive 2-6. The speed feedback signal 2-12 is typically, but not exclusively, formed as a pulse sequence. In the presently described embodiment, the speed output unit 2-6B processes the speed feedback signal 2-12 primarily for the purpose of motor speed control in a closed-loop configuration. In the presently described embodiment, the processed speed feedback signal, denoted by reference sign 2-12' is also branched off to a condition monitoring unit CMU. For a more detailed description of the CMU, a reference is made to FIG. 17, which illustrates an external condition monitoring unit. In other embodiments, the functionality of the condition monitoring unit can equally well be integrated into the controller of the motor drive.

The signal 2-12' branched off from the closed-loop motor configuration to the condition monitoring unit CMU, may already be in an advantegeous format for processing by the CMU. For instance, an advantegeous format may be or comprise a rotational speed sampled at equal intervals. The signal is preferably a digital signal.

The speed control configuration can be controlled from a wired or wireless control device, generally denoted by reference number 2-14. The motor 2-8 drives a gear 2-16. The gear 2-16 in turn drives a hoist 2-18, which in this example raises or lowers a load 2-20. In some applications, such as escalators, load movement may be unidirectional.

It was a hypothesis by the inventors that:
1. If the process, (eg speed or actual speed vs. set speed) changes,
2. Absent changes in the controlling process, such as under constant set values,
3. This change can indicate wear in the equipment and, optionally, the component(s) most likely to exhibit wear.

The inventors have tested this hypothesis successfully and experimented with various concrete embodiments for putting the invention to practical use.

Figure 3:
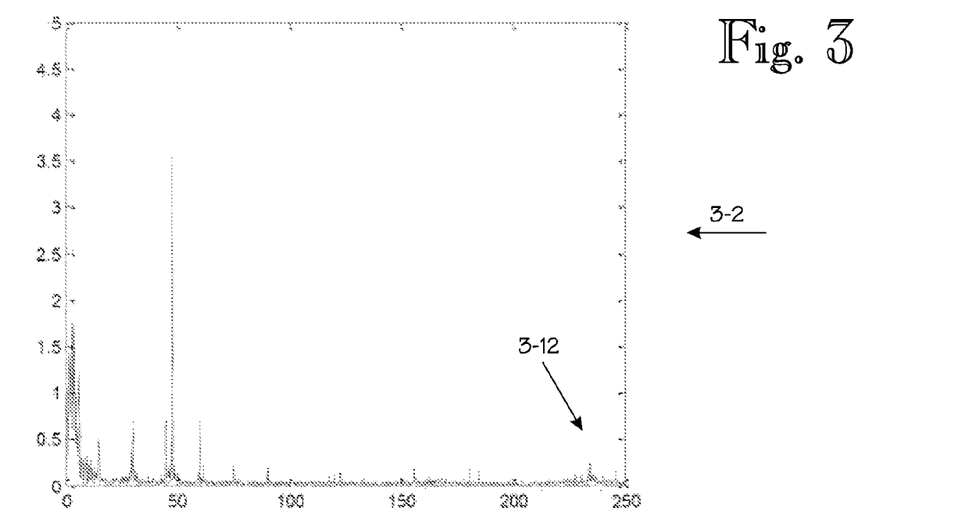
FIGS. 3 and 4 show measurement results in frequency domain and time domain, respectively, at the beginning of a test.
Figure 4:
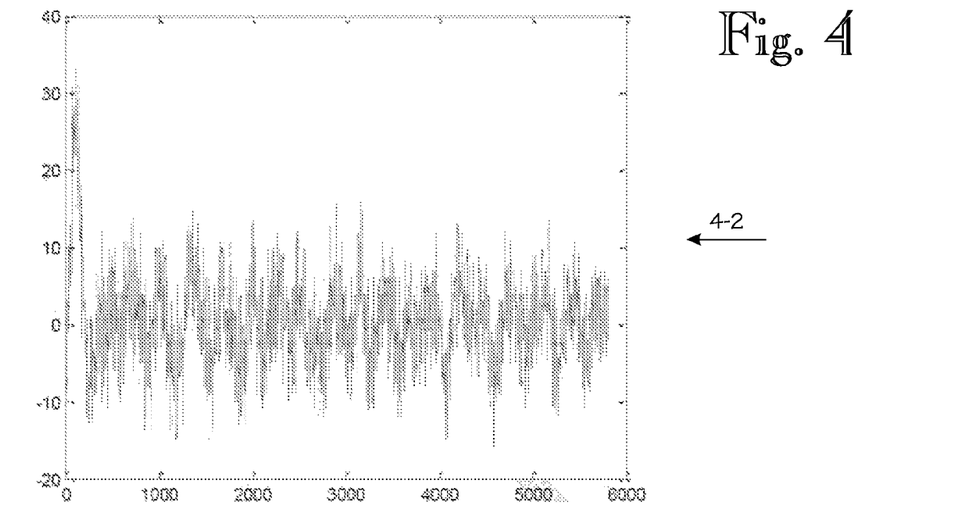
Figure 5:
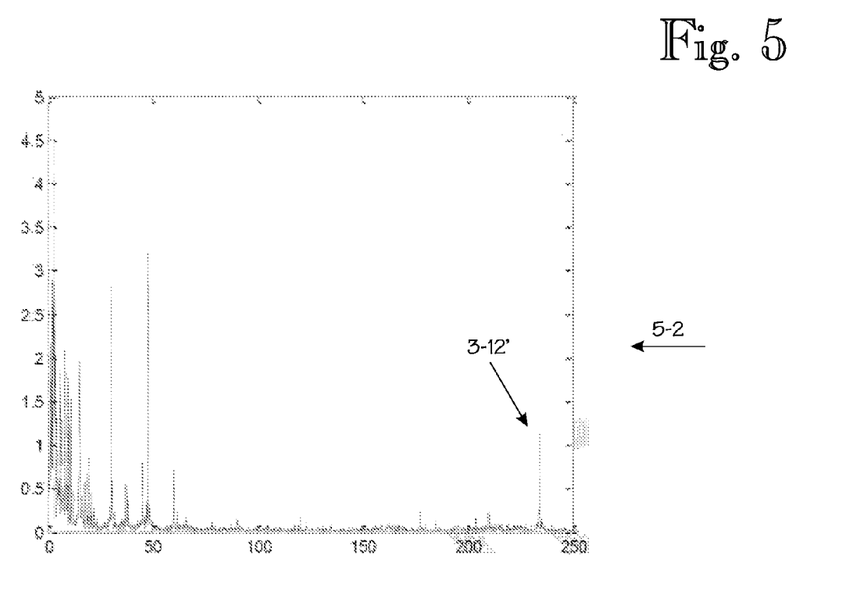
FIGS. 5 and 6 show measurement results in frequency domain and time domain, respectively, at the end of the test.
Figure 6:
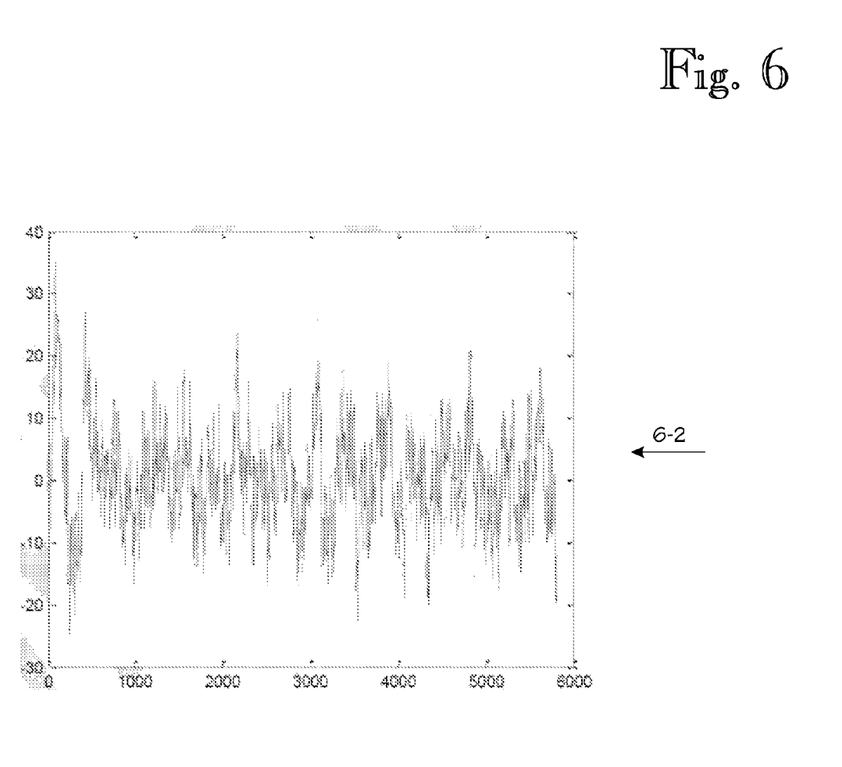

FIGS. 3 and 4 show measurement results in frequency domain (diagram 3-2) and time domain (diagram 4-2), respectively, at the beginning of a test. FIGS. 5 and 6 show measurement results in frequency domain (diagram 5-2) and time domain (diagram 6-2), respectively, at the end of the test. As can be seen from FIG. 3, peak heights vary greatly for different frequencies. By comparing the results plotted in frequency domain, namely FIGS. 3 and 5 (beginning and end of test, respectively), it is evident that the peak at 234 Hz, denoted by reference numbers 3-12 and 3-12', has increased significantly towards the end of the test. In addition, some new visible peaks have appeared at frequencies between 0 and 30 Hz. The origin for the 234 Hz peak turned out to be a 3rd multiple of an axle mesh frequency at 78 Hz (3*78=234).

Figure 7:
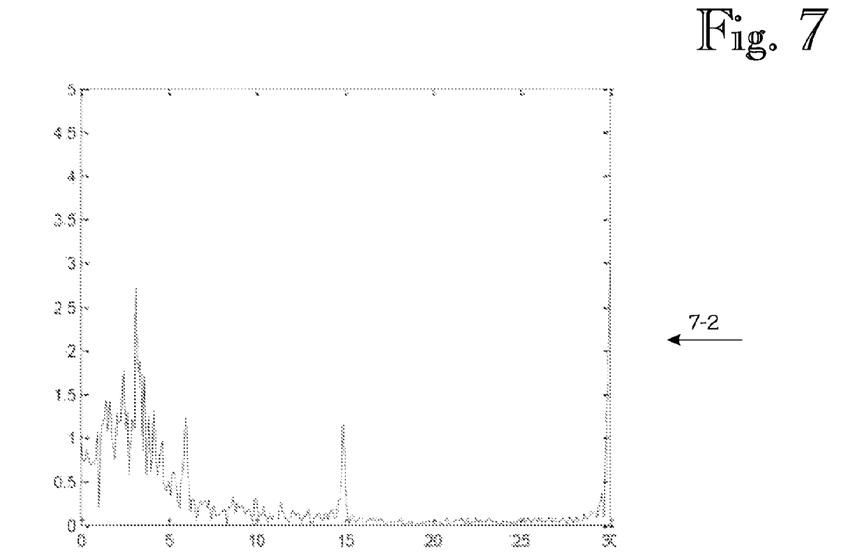
FIGS. 7 and 8 show that some of the low-frequency peaks exhibit significant increases between the beginning and the end of the test.
Figure 8:
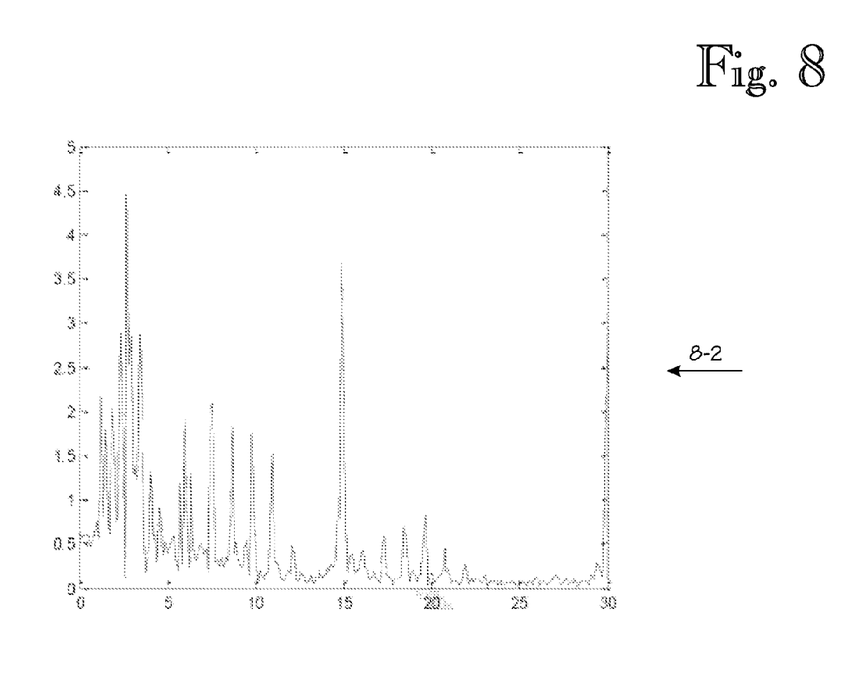

FIGS. 7 and 8 show respective spectra 7-2 and 8-2. The spectra show that some of the low-frequency peaks exhibit significant increases between the beginning and the end of the test. The inventors have discovered that these low-frequency peaks are relevant failure indicators for the particular gear that was used for the tests. The calculated failure frequencies are listed in Table 1. Frequencies that can be obtained from speed measurement plotted in the frequency domain are indicated by > or >> signs. Single > signs indicate good matches and double >> signs indicate very good matches. A good match exists between the calculated and measured frequencies, and there is no doubt that the gear condition has changed during the test. Even relatively small frequency peaks can be detected by this methodology.

The following table relates to a gear with four axles I-IV, with each axle having two bearings 1 and 2. Stages I, II and III refer to gear mesh wherein one wheel contacts another.

TABLE 1 calculated frequencies for indicating possible gear failure

| Mesh | Shafts | Bearings | Inner Race | Outer Race | Ball | Retainer |
|---|---|---|---|---|---|---|
| | I >>29.82 | 1 | 146.9 | >91.8 | >>122.2 | 11.5 |
| | | 2 | >132.4 | >76.4 | 103.2 | >>10.9 |
| I stage>387.62 | II >>5.96 | 1 | >50.4 | >32.8 | 13.4 | >>2.3 |
| | | 2 | >50.4 | >32.8 | 13.4 | >>2.3 |
| II stage >>77.52 | III >1.14 | 1 | >>9.7 | >6.2 | >2.4 | 0.4 |
| | | 2 | >>9.7 | >6.2 | >2.4 | 0.4 |
| III stage >>14.82 | IV 0.23 | 1 | >3.3 | >>2.7 | >>2.3 | 0.1 |
| | | 2 | >3.3 | >>2.7 | >>2.3 | 0.1 |

The above table 1 gives the frequencies on the basis of mechanical specifications. In environments wherein the key frequencies cannot be obtained from mechanical specifications. The frequencies can be obtained empirically. For instance, a measurement is started and data is collected for a while. Frequencies whose amplitudes increase or which are distinguished by some other means will be selected for long-time observation. After an interval, which is experimentally known to be long enough for significant changes to appear, the measurement is repeated, and the measured frequencies before the interval ("the first frequencies") and after the interval ("the second frequencies") are compared to detect new or increased peaks. The data collection and comparison is repeated at a rate which is experimentally known to be sufficiently high to detect significant changes before actual equipment failure. When one or more frequencies with significant changes are detected, it is beneficial for the condition monitoring unit to adapt its monitoring scheme, eg, by taking observations at an increased rate.

Figure 9:
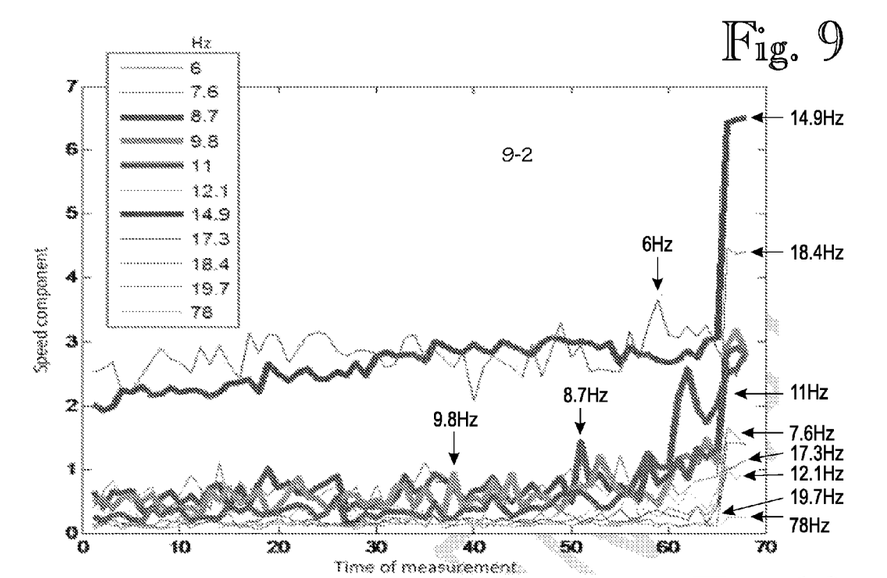
FIG. 9 shows these frequencies in timeline format during a test, which ran for eight to nine hours per day.

Some potentially interesting frequencies were chosen for more detailed analyses. FIG. 9 shows some of these frequencies, generally denoted by reference number 9-2, in timeline format during the test, which ran for eight to nine hours per day. Measurements were taken twice per day, three individual measurements at both times. Near the end of the test, the test ran continuously. This measurement anomaly explains the sharp rises for many frequencies near the end of the test. In this test, significant changes between the beginning and the end of the test was detected at frequencies 8.7 Hz, 9.8 Hz, 11 Hz, and 14.9 Hz.

Figure 10:
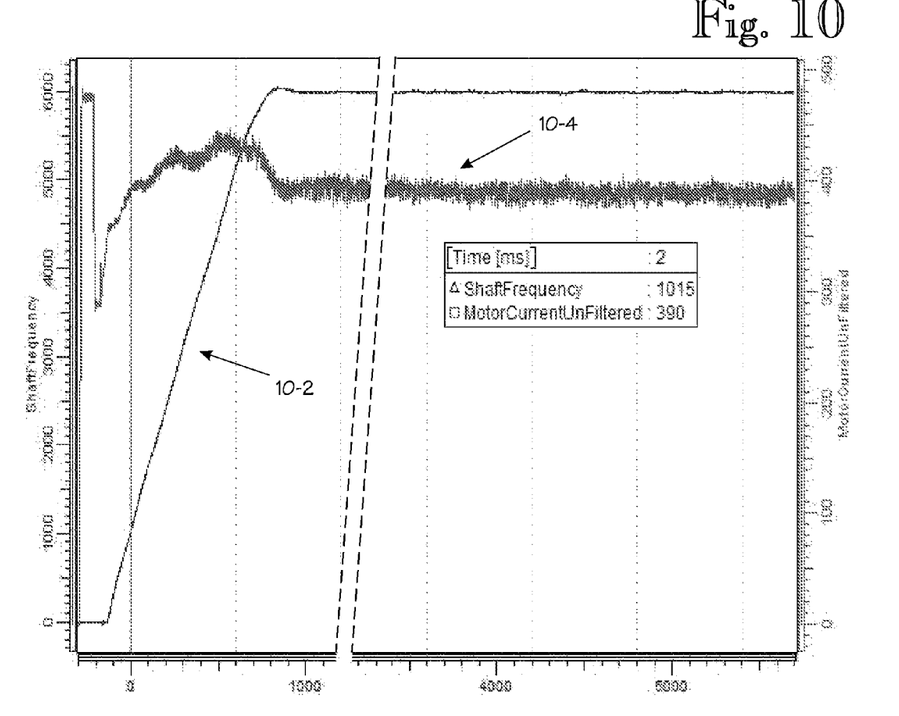
FIG. 10 shows a plot of shaft speed and unfiltered motor currency vs. time over the course of a test run.

FIG. 10 shows a plot of shaft speed 10-2 and unfiltered motor currency 10-4 vs. time over the course of a test run. The immediate purpose of this test was to find out how the variation of speed affects the analysis and its results. A more far-reaching purpose was to develop algorithms and/or identify characteristic frequencies that detect wear and/or predict failure in gear systems regardless of the speeds and loads used.

Figure 11:
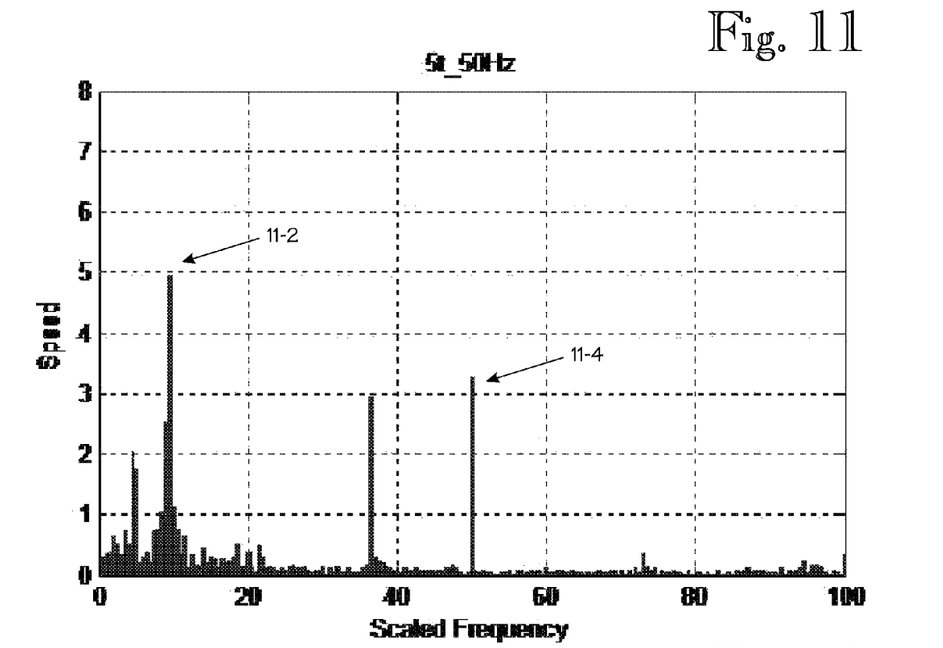
FIGS. 11 through 16 illustrate data scalability with six different speeds ranging from 50 to 75 Hz at 5 Hz apart.

FIGS. 11 through 16 illustrate data scalability with six different speeds ranging from 50 to 75 Hz at 5 Hz apart. An equal load (5 tons) was used at all speeds. In FIG. 11, reference number 11-2 denotes a peak caused by a mass-spring effect generated by the load and ropes, while reference number 11-4 denotes the speed of the drive itself in Hz. Although FIGS. 11 through 16 were obtained at speeds of 50, 55, 60, 65, 70 and 75 Hz, all results have been presented with scaled frequencies. Accordingly, the peak 11-4, which is caused by the varying drive speed, always occurs at the 50-Hz mark.

Figure 12:
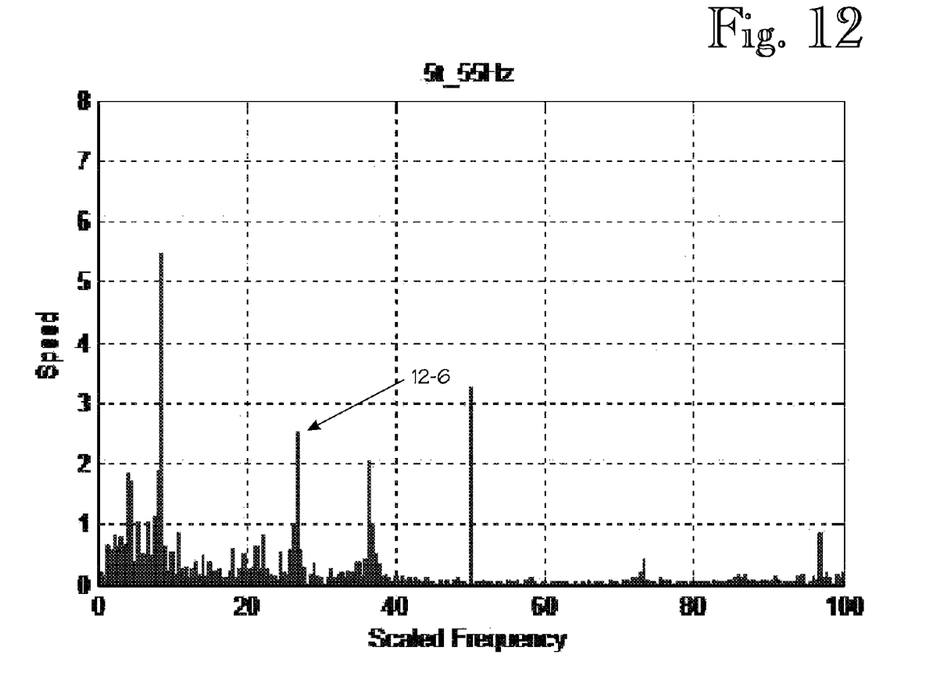
Figure 13:
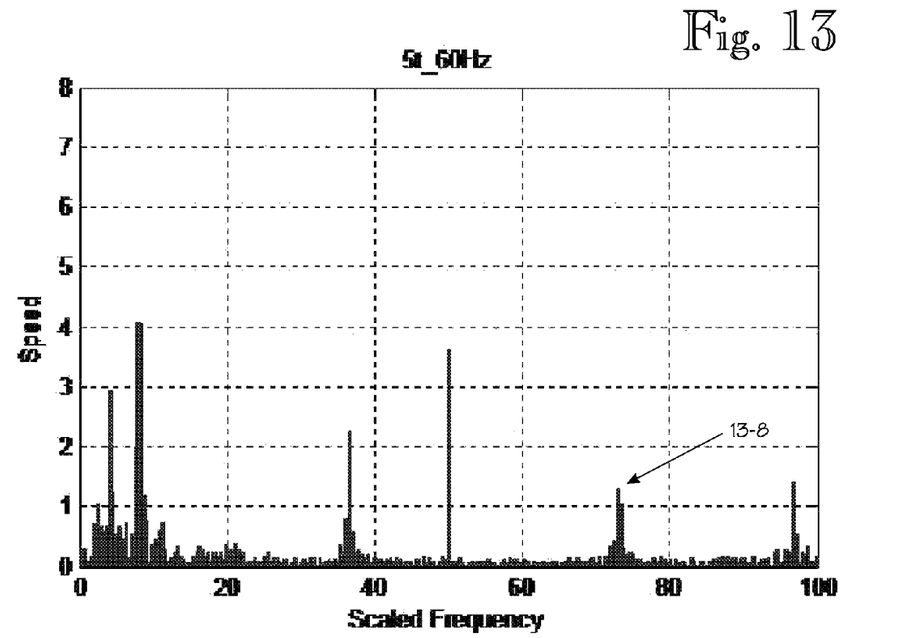
Figure 14:
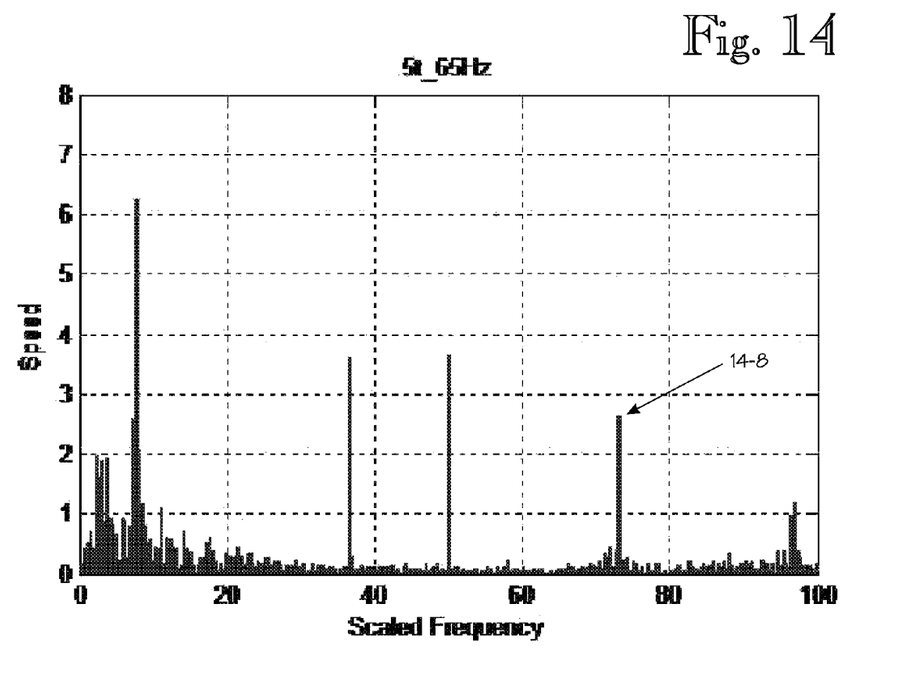
Figure 15:
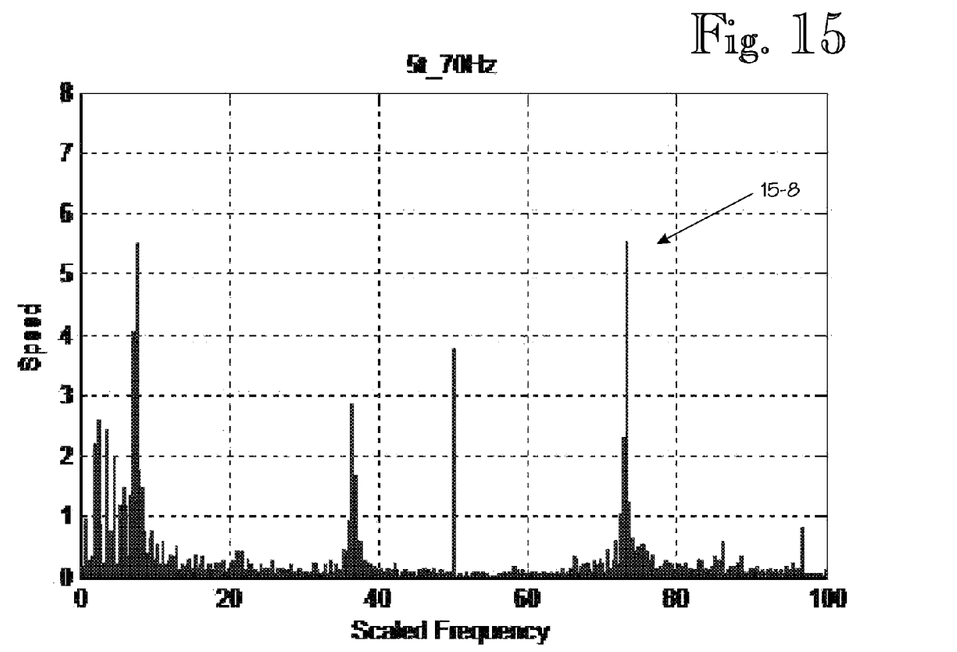
Figure 16:
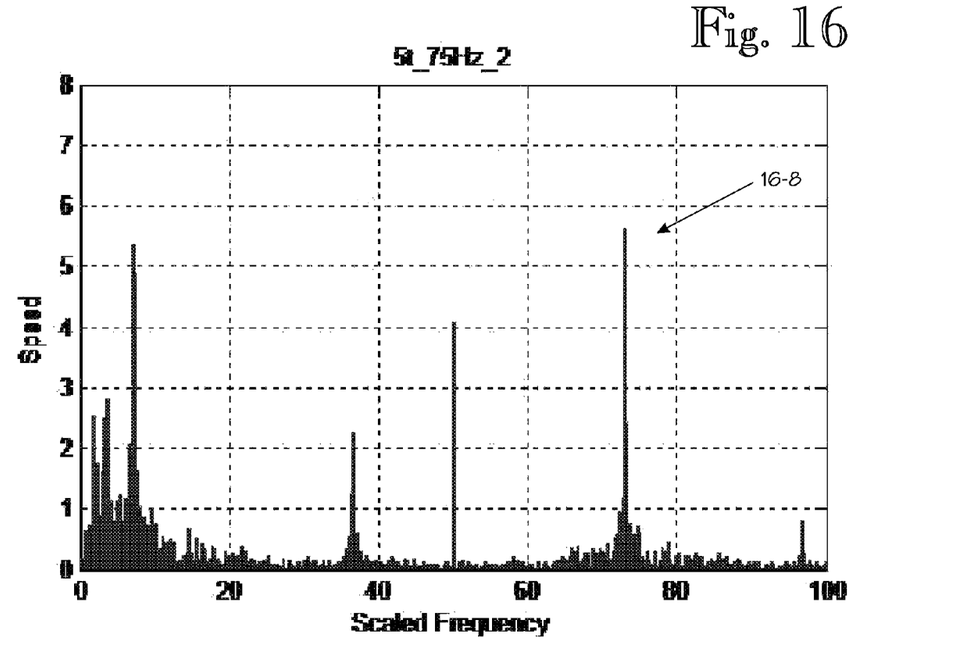

In FIG. 12, reference number 12-6 denotes a resonance frequency.

In FIGS. 13 through 16, respective reference numbers 13-8 through 16-8 denote development of a frequency peak at the various frequencies.

Figure 17:
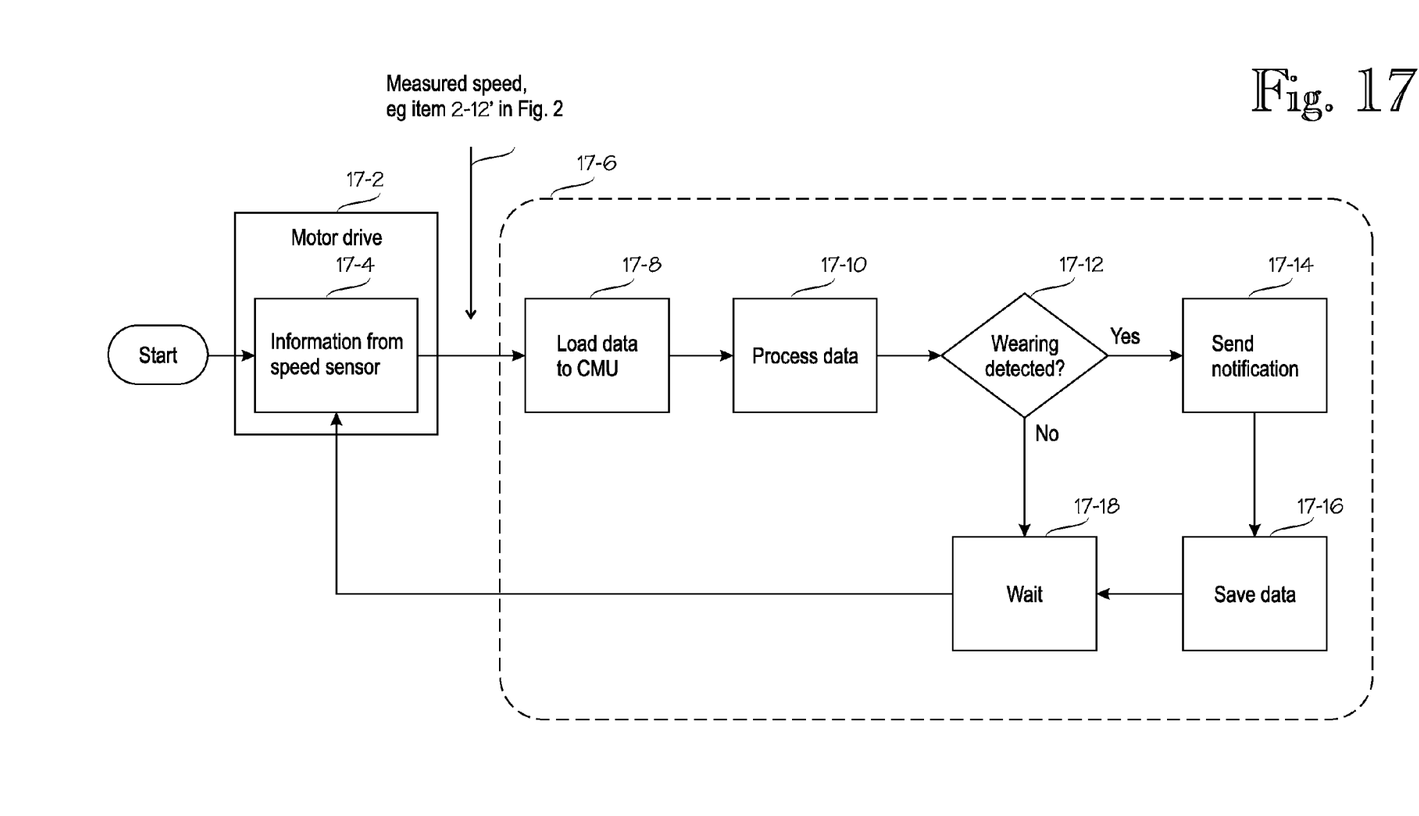
FIG. 17 shows a software architecture that was used in a working protototype for an external Condition Monitoring Unit.

FIG. 17 shows a software architecture that was used in a working prototype, which is called a Condition Monitoring Unit ("CMU") in the following. The CMU, denoted by reference number 17-6, was coupled to a D2V drive 17-2 manufactured by the owner of the present application. For the purposes of the present invention, the drive 17-2 is a part of an example of the equipment whose condition is being monitored. The drive may also receive information from an actual speed output unit 17-4. On the basis of the teaching provided herein, the inventive principle is adaptable to other types of drives by using routine skills.

As regards the software architecture shown in FIG. 17, first the in-built data logger of the D2V drive is set to collect the correct signals. When the crane or hoist is driven at a continuous and stable speed, the data logger trigs and starts to collect data. It is beneficial to collect data during an even or nearly even run. Measurements can be made, for instance, by storing the speed output signal continuously. Measurements can be repeated periodically or when triggered by other considerations, for instance in cases where changes have been made to the system or its operating conditions, and the rate can be increased (period shortened) when significant changes are detected. When enough data have been collected, it is transferred to the condition monitoring unit CMU for data processing (17-8). First the eligibility of the data is checked, and if the data is correct, it will be processed for detecting possible wear of the gear (17-10). If the CMU 17-6 detects in test 17-12 that the wear condition exceeds certain given limits, it will initiate sending a notification or alarm to a remote center or operator (17-14) to investigate the matter. The data will be saved for further study (17-16). After that, the CMU 17-6 is in standby mode for the next measurement. If no signs of wearing are detected, no alarm is sent, and the data logger is prepared for the next measurement. Even in cases where no alarm condition is detected, the data may be saved for further study and/or confirmation purposes. In the prototype phase, the data processing was not yet implemented in the CMU, so decisions on actual alert conditions was not done by the CMU. Nevertheless, studies carried out so far have confirmed the hypothesis of the inventors that monitoring progress of frequency peaks over time in a closed-loop motor drive configuration can yield data capable of indicating wear condition and/or predicting failure in a gear system, even without installation of additional sensors.

It is beneficial to make the periodically repeated measurements when the system is being run under constant or near-constant conditions, with substantially constant speed. A reason for making periodically repeated measurements is to maintain the requirements for data storage capacity at a reasonable level. Alternatively, measurements can be made whenever an opportunity is detected. If no significant changes from the previous measurement are detected, the raw data can be deleted and only a log entry is made, indicating that results were substantially similar to a previous measurement.

Those skilled in the art will realize that the inventive principle may be modified in various ways without departing from the scope of the present invention.

The invention claimed is:

1. A method comprising performing the following steps with respect to a system that comprises an electrical motor and a speed output unit, and the electrical motor is followed by a gear, wherein the following acts are performed by a data processing system operationally coupled to the system:
   monitoring a first set of frequencies from the system over a measurement period when the system is in a known good operating condition;
   storing the first set of monitored frequencies or derivatives thereof as reference data in a long-term storage system;
   monitoring a second set of frequencies from the system over a measurement period when the system is in an unknown operating condition;
   comparing the second set of monitored frequencies with the first set of monitored frequencies in a frequency domain; and
   in the frequency domain, detecting changes between corresponding frequencies resulting from the second set of monitored frequencies and the first set of monitored frequencies,
   wherein the electrical motor is driven by a motor drive, and the electrical motor and the motor drive are in a closed-loop configuration,
   wherein the motor drive utilizes a closed-loop speed feedback signal for controlling the electrical motor and the motor drive in the closed-loop configuration, and wherein at least some of the monitored frequencies are obtained from the closed-loop speed feedback signal or its derivative, and
   wherein the closed-loop speed feedback signal or its derivative comprises a rotational speed information of the electric motor, wherein the rotational speed information is sampled at equal intervals.

2. The method according to claim 1, further comprising indicating an alert condition if at least one detected change between the corresponding frequencies exceeds a predetermined threshold.

3. The method according to claim 1, further comprising indicating an alert condition if at least one detected change between the corresponding frequencies exceeds an average change computed over several other changes.

4. The method according to claim 1, further comprising scaling the frequencies to a common frequency if the frequency peaks were obtained at different speeds.

5. The method according to claim 1, further comprising maintaining data that indicates a set of predictor frequencies at which the detected changes correlate with wear better than at randomly selected frequencies.

6. The method according to claim 5, further comprising weighting changes at the predictor frequencies more strongly than changes at other frequencies.

7. The method according to claim 1, further comprising increasing a rate of monitoring the second set of frequencies in response to one or more of said changes meeting a set of significance criteria.

8. The method according to claim 1, wherein said comparing the sets of monitored frequencies comprises a cepstrum conversion of each of the first and second set of monitored frequencies.

9. The method according to claim 1, wherein said monitoring the first and second set of frequencies comprises monitoring a set value and an actual value of the electrical motor in the closed-loop configuration.

10. The method according to claim 1, wherein the monitored sets of frequencies comprise frequency peaks in the frequency domain.

11. A data processing system comprising:
    a memory system for storing program code instructions and data;
    a processing system including at least one processor, wherein the processing system executes at least a portion of the program code instructions and processes the data; and
    a connection to a system comprising at least a speed output unit and an electrical motor;
    wherein the memory system stores program code instructions that, when executed by the at least one processor, instruct the at least one processor to perform the following steps:
    monitoring a first set of frequencies from the system over a measurement period when the system is in a known good operating condition;
    storing the first set of monitored frequencies or derivatives thereof as reference data in a long-term storage system;
    monitoring a second set of frequencies from the system over a measurement period when the system is in an unknown operating condition;
    comparing the second set of monitored frequencies with the first set of monitored frequencies in a frequency domain; and
    in the frequency domain, detecting changes between corresponding frequencies resulting from the second set of monitored frequencies and the first set of monitored frequencies,
    wherein the electrical motor is driven by a motor drive, and the electrical motor and the motor drive are in a closed-loop configuration,
    wherein the motor drive utilizes a closed-loop speed feedback signal for controlling the electrical motor and the motor drive in the closed-loop configuration, and wherein at least some of the monitored frequencies are obtained from the closed-loop speed feedback signal or its derivative, and wherein the closed-loop speed feedback signal or its derivative comprises a rotational speed information of the electric motor, wherein the rotational speed information is sampled at equal intervals.

12. The data processing system according to claim 11, wherein the at least one processor further indicates an alert condition if at least one detected change between the corresponding frequencies exceeds a predetermined threshold.

13. The data processing system according to claim 11, wherein the at least one processor further indicates an alert condition if at least one detected change between the corresponding frequencies exceeds an average change computed over several other changes.

14. The data processing system according to claim 11, wherein the at least one processor further scales the frequencies to a common frequency if the frequency peaks were obtained at different speeds.

15. The data processing system according to claim 11, wherein the at least one processor further maintains data that indicates a set of predictor frequencies at which the detected changes correlate with wear better than at randomly selected frequencies.

16. The data processing system according to claim 15, wherein the at least one processor further weights changes at the predictor frequencies more strongly than changes at other frequencies.

17. The data processing system according to claim 11, wherein the at least one processor further increases a rate of monitoring the second set of frequencies in response to one or more of said changes meeting a set of significance criteria.

18. The data processing system according to claim 11, wherein said comparing the sets of monitored frequencies comprises a cepstrum conversion of each of the first and second set of monitored frequencies.

19. The data processing system according to claim 11, wherein said monitoring the first and second set of frequencies comprises monitoring a set value and an actual value of the electrical motor in the closed-loop configuration.

20. The data processing system according to claim 11, wherein the monitored sets of frequencies comprise frequency peaks in the frequency domain.

* * * * *